United States Patent
Kimata et al.

(10) Patent No.: US 7,656,940 B2
(45) Date of Patent: Feb. 2, 2010

(54) EQUALIZER AND EQUALIZING METHOD

(75) Inventors: Masayuki Kimata, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 500 days.

(21) Appl. No.: 11/479,265

(22) Filed: Jun. 30, 2006

(65) Prior Publication Data
US 2007/0009023 A1 Jan. 11, 2007

(30) Foreign Application Priority Data
Jul. 7, 2005 (JP) .............. 2005-198658

(51) Int. Cl.
H03H 7/30 (2006.01)
G06F 17/10 (2006.01)

(52) U.S. Cl. ...................... 375/229; 708/322

(58) Field of Classification Search ........... 375/229, 375/232, 260, 346, 350; 455/213; 708/322, 708/323; 332/28 R
See application file for complete search history.

(56) References Cited

U.S. PATENT DOCUMENTS

2005/0265226 A1* 12/2005 Shen et al. ............. 370/210
2005/0271151 A1* 12/2005 Cho et al. ............... 375/260

FOREIGN PATENT DOCUMENTS

JP 2003-101503 A 4/2003

OTHER PUBLICATIONS

D. Falconer, S.L. Ariyavisitakul, A. Benyamin-Seeyar, and B. Eidson, "Frequency Domain Equalization for Single-Carrier Broadband Wireless Systems", IEEE Commun. Mag., vol. 40, No. 4, pp. 58-66, Apr. 2002.

* cited by examiner

Primary Examiner—Khai Tran
(74) Attorney, Agent, or Firm—Scully, Scott, Murphy & Presser, P.C.

(57) ABSTRACT

Filtering part 50 performs filtering by converting a received signal sampled using a predetermined number of over-samples to an over-sample number small enough to avoid frequency-domain foldover noise generation. Transmission channel estimation part 60 performs path timing detection by converting the received signal sampled using a predetermined number of over-samples to an over-sample number large enough to obtain sufficient timing resolution, converts transmission channel responses for each path timing to the frequency domain, and calculates transmission channel estimates corresponding to the subcarriers of the received signal in the frequency domain. Weight calculation part 6 receives the frequency-domain channel estimates outputted from transmission channel estimation part 60 and calculates the weights of the equalizing filter used in filtering part 50.

14 Claims, 5 Drawing Sheets

US 7,656,940 B2

EQUALIZER AND EQUALIZING METHOD

BACKGROUND OF THE INVENTION

1. Field of the Invention

The present invention relates to an equalizer and an equalizing method and, in particular, relates to an equalizer and an equalizing method, in which equalization of a received signal is carried out using the minimum mean square error method (MMSE: Minimum Mean Square Error) or zero forcing method based on signal processing in the frequency domain.

2. Description of Related Art

Implementing high-speed data transmission in the next-generation wireless communication systems for mobile communications is an important task, but the increased data rates lead to problems associated with inter-symbol interference (multipath interference) due to multipath signals. There are various methods of suppression of such multipath interference, including relatively simple methods based on the use of linear equalizers or proposals involving frequency equalizers, which perform such equalization processing in the frequency domain (for example, see D. Falconer, S. L. Ariyavisitakul, A. Benyamin-Seeyar, and B. Eidson, "Frequency Domain Equalization for Single-Carrier Broadband Wireless Systems", IEEE Commun. Mag., vol. 40, no. 4, pp. 58-66, April 2002, hereinafter, referred to as "prior art document 1").

FIG. 8 illustrates an exemplary equalizer configuration that makes use of a frequency equalizer, as described in the prior art document 1. This conventional equalizer comprises receiving antenna 1, filtering part 100, transmission channel estimation part 110, and weight calculation part 6. Receiving antenna 1 receives a digitally modulated single-carrier signal. A received signal sampled using a predetermined number of over-samples is inputted to filtering part 100, which performs filtering. A received signal sampled using a predetermined number of over-samples is inputted to transmission channel estimation part 110, which performs path timing detection, converts transmission channel responses for each path timing to the frequency domain, and calculates transmission channel estimates corresponding to the subcarriers of the received signal in the frequency domain. The frequency-domain channel estimates outputted from transmission channel estimation part 110 are inputted to weight calculation part 6, which calculates the weights of the equalizing filter used in filtering part 100. In the conventional equalizer, all the processing of filtering part 100, transmission channel estimation part 110, and weight calculation part 6 is performed using the same over-sample number.

The filtering part 100 comprises guard interval (GI) removal part 7, serial-to-parallel (S/P) converter 8, FFT (Fast Fourier Transform) part 9, equalizing filter 10, IFFT (Inverse FFT) part 11, and parallel-to-serial (P/S) converter 12. A received signal sampled using an over-sample number of $N_{OS}$ is inputted to GI removal part 7, which removes the portion corresponding to the GI from the received signal. S/P converter 8 performs S/P conversion of the received signal, from which the GI has been removed by GI removal part 7. The received signal converted by S/P converter 8 is inputted to FFT part 9, which converts it to the frequency domain using FFT of $N_{OS} \times N_{FFT}$ points ($N_{FFT}$: FFT block length). The weights calculated by weight calculation part 6 and the received signal converted to the frequency domain by FFT part 9 are inputted to equalizing filter 10, which performs filtering (equalization) of the received signal in the frequency domain. If the received signal converted to the frequency domain in FFT part 9 is designated as X(f) ($1 \leq f \leq N_{OS} \times N_{FFT}$) and the weights calculated by weight calculation part 6 are designated as W(f), then the equalized signal Y(f) filtered by equalizing filter 10 will be given by Y(f)=W(f)X(f). Here, f designates a subcarrier point. The equalized frequency-domain signal outputted by equalizing filter 10 is inputted to IFFT part 11, which converts it to the time domain using IFFT of $N_{OS} \times N_{FFT}$ points. P/S converter 12 performs P/S conversion of the signal converted to the time domain and outputs a demodulated signal.

Transmission channel estimation part 110 comprises timing detection part 2, transmission channel response estimation part 3, S/P converter 4, and FFT part 5. The received signal with an over-sample number of $N_{OS}$ is inputted to the timing detection part 2, which uses the pilot signal contained in the received signal to detect the timing of a plurality of paths. Methods used for timing detection include, inter alia, a method for detecting the timing of a plurality of high-level paths based on the results of detection of sliding correlation between the pilot signal contained in the received signal and a known pilot signal sequence. The received signal with an over-sample number of $N_{OS}$ and the path timings detected by timing detection part 2 are inputted to transmission channel response estimation part 3, which uses the pilot signal contained in the received signal to calculate transmission channel estimates at the timing points and to obtain impulse responses. S/P converter 4 performs S/P conversion of the impulse responses of the transmission channels estimated by transmission channel response estimation part 3. The impulse responses of the transmission channel converted by S/P converter 4 are inputted to FFT part 5, which outputs transmission channel estimates converted to the frequency domain using FFT of $N_{OS} \times N_{FFT}$ points.

The frequency-domain transmission channel estimates outputted from FFT part 5 are inputted to weight calculation part 6, which calculates the weights of equalizing filter 10. The calculations are based on the minimum mean square error method (MMSE: Minimum Mean Square Error) or the zero forcing method, etc. When using the MMSE method, the weights W(f) of equalizing filter 10 are given by;

$$W(f)=H^*(f)/(|H(f)|^2+N_0)$$

Here, * represents a complex conjugate and $N_0$ noise power.

In a conventional equalizer, timing detection part 2, FFT part 5, weight calculation part 6, FFT part 9, equalizing filter 10, and IFFT part 11 are all operated using an over-sample number of $N_{OS}$. Accordingly, in order to improve channel estimation accuracy in a conventional equalizer, it is necessary to raise the timing resolution, i.e., the over-sample number $N_{OS}$, but the problem with increasing the number of over-samples $N_{OS}$ is that it leads to an increase in the processing size of FFT parts 5 and 9 and IFFT part 11, as well as an increase in the computational burden of weight calculation part 6 and equalizing filter 10.

The present invention provides an equalizer and an equalizing method that address such problems and are capable of implementing superior equalization characteristics while suppressing the processing size of the FFT parts in a frequency equalizer performing equalization using frequency domain signal processing.

SUMMARY OF THE INVENTION

The main feature of the present invention is the use of different over-sample numbers for every process in the filtering part and transmission channel estimation part in a frequency equalizer performing equalization using frequency domain signal processing.

Namely, the equalizer of the present invention is an equalizer receiving a digitally modulated single-carrier signal and performing equalization using frequency domain signal processing, wherein the equalizer comprises a filtering part accepting a received signal sampled using a predetermined number of over-samples as input and performing filtering by converting the received signal to an over-sample number small enough to avoid foldover noise generation in the frequency domain; a transmission channel estimation part converting the received signal to an over-sample number large enough to obtain sufficient timing resolution, performing path timing detection using the timing resolution, converting the transmission channel responses corresponding to the path timings to the frequency domain, and calculating transmission channel estimates corresponding to the subcarriers of the received signal in the frequency domain; and a weight calculation part, which calculates the weights of the equalizing filter used in the filtering part based on the output of the transmission channel estimation part.

A technology used for noise path elimination during channel estimation in the frequency domain is described in JP 2003-101503A (hereinafter, referred to as "prior art document 2") as a technology for performing upsampling in connection with transmission channel estimation. However, the present invention deals with channel estimation in the time domain, and therefore its object, as well as constitution and effects, are different from the technology described in the prior art document 2. In the technology described in the prior art document 2, as mentioned in Par. 0015 of the disclosure, the frequency domain channel estimation system is influenced by the noise path, which is why frequency-domain channel estimates are changed back to time-domain channel estimates using IFFT in order to delete the noise path. In the prior art document 2, the upsampling is carried out for the purpose of interpolating frequency-domain channel estimates when channel estimation is performed in the frequency domain and, unlike the present invention, is not the aimed at improving the resolution of time-domain channel estimates. In the present invention, the resolution of time-domain channel estimates is improved by carrying out upsampling prior to the time-domain channel estimation. This is different from performing channel estimation in the frequency domain, as in the prior art document 2, because transmission channel estimates are obtained only for the timing points and there is absolutely no noise path influence.

The filtering part preferably has a downsampling part that downsamples a received signal sampled using an over-sample number of $N_{OS}$ to an over-sample number of $N'_{OS}$ ($N'_{OS}=N_{OS}/n$, where n is 1 or greater and is an integer equal to a power of 2), a first FFT part that performs a fast Fourier transform (FFT: Fast Fourier Transform) on the output of the downsampling part using $N'_{OS} \times N_{FFT}$ points ($N_{FFT}$: fast Fourier transform block length), an equalizing filter that filters the output of the first FFT part using the weights, and an IFFT part that performs an inverse fast Fourier transform (IFFT: Inverse Fast Fourier Transform) on the output of the equalizing filter using $N'_{OS} \times N_{FFT}$ points.

The transmission channel estimation part preferably has an upsampling part that uses an over-sample number of $N''_{OS}$ ($N''_{OS}=mN_{OS}$, where m is 1 or greater and is an integer equal to a power of 2) to upsample the received signal sampled using an over-sample number of $N_{OS}$, a timing detection part that detects the timings of a plurality of paths using the output of the upsampling part, a transmission channel response estimation part that estimates the transmission channels at a plurality of detected path timings, a second FFT part that performs FFT on the impulse responses obtained as output from the transmission channel response estimation part using $N''_{OS} \times N'_{FFT}$ points ($N'_{FFT}=N_{FFT}/l$, where l is 1 or greater and is an integer equal to a power of 2 and $N'_{FFT}$ is an FFT block length), a subcarrier removal part that removes high frequency component subcarriers from the subcarriers outputted from the second FFT part, and a subcarrier interpolation part that performs subcarrier interpolation between subcarriers remaining after removal by the subcarrier removal part.

In addition, the transmission channel estimation part preferably has an upsampling part that upsamples the received signal sampled using an over-sample number of $N_{OS}$ to an over-sample number of $N''_{OS}$, a timing detection part that detects the timings of a plurality of paths using the received signal, a transmission channel response estimation part that estimates the transmission channels at a plurality of detected path timings, a second FFT part that performs FFT on the impulse responses obtained as output from the transmission channel response estimation part using $N''_{OS} \times N'_{FFT}$ points, a subcarrier removal part that removes high frequency component subcarriers form the subcarriers outputted from the second FFT part, and a subcarrier interpolation part that performs subcarrier interpolation between the subcarriers remaining after removal by the subcarrier removal part.

It is preferable for the weight calculation part to calculate the weights of the equalizing filter using the minimum mean square error method (MMSE: Minimum Mean Square Error) or the zero forcing method.

As described above, configurations considered for the timing detection part include a configuration utilizing a post-upsampling received signal with an over-sample number of $N''_{OS}$ and a configuration utilizing a pre-upsampling received signal with an over-sample number of $N_{OS}$.

A configuration having a delay profile generation part that generates a delay profile based on the results of detection of sliding correlation between a known pilot signal sequence and a pilot signal contained in an upsampled received signal with an over-sample number of $N''_{OS}$, and a path timing selection part that selects the timings of a plurality of high-level paths using this delay profile, can be utilized for a timing detection part using a received signal with an over-sample number of $N''_{OS}$.

A configuration having a delay profile generation part that generates a delay profile based on the results of detection of sliding correlation between a known pilot signal sequence and a pilot signal contained in a received signal with an over-sample number of $N_{OS}$, a profile interpolation part that interpolates the delay profile to an over-sample number of $N''_{OS}$, and a path timing selection part that selects the timings of a plurality of high-level paths using the output of the profile interpolation part, can be utilized for a timing detection part using a received signal with an over-sample number of $N_{OS}$.

Additionally, a configuration having a delay profile generation part that generates a delay profile based on the results of detection of sliding correlation between a known pilot signal sequence and a pilot signal contained in a received signal with an over-sample number of $N_{OS}$, a path timing selection part that selects the timings of a plurality of high-level paths based on the delay profile, a partial profile interpolation part that interpolates the delay profile in the peripheral portions of the path timings to an over-sample number of $N''_{OS}$ based on the delay profile and the timings of the plurality of paths, and a path timing adjustment part that designates the highest-level points in each path as the path timings using the output of the partial profile interpolation part, can be utilized for a timing detection part using a received signal with an over-sample number of $N_{OS}$.

A configuration having a delay profile generation part that generates a delay profile based on the results of detection of sliding correlation between a known pilot signal sequence and a pilot signal contained in a received signal with an over-sample number of $N_{OS}$, a path timing selection part that selects the timings of a plurality of high-level paths based on the delay profile, a partial profile calculation part that calculates the delay profile in the peripheral portions of the path timings using the timings of the plurality of paths and the upsampled received signal with an over-sample number of $N''_{OS}$, and a path timing adjustment part that designates the highest-level points in each path as the path timings using the output of the partial profile calculation part, can be utilized for a timing detection part using a received signal with an over-sample number of $N_{OS}$.

In the transmission channel estimation part, the subcarrier removal part removes subcarriers in the range of $(N'_{OS}/2) \times (N_{FFT}/1) < f \leq (N''_{OS} - N'_{OS}/2) \times (N_{FFT}/1)$ for transmission channel estimates. $H(f)$ $(1 \leq f \leq N''_{OS} \times (N_{FFT}/1))$ outputted from the second FFT part.

In the transmission channel estimation part, the subcarrier interpolation part performs subcarrier interpolation with l-1 subcarriers each between the subcarriers, using the subcarriers in the range of $1 \leq f \leq (N'_{OS}/2) \times (N_{FFT}/1)$, $(N''_{OS} - N'_{OS}/2) \times (N_{FFT}/1) < f \leq N''_{OS} \times (N_{FFT}/1)$, i.e. the remainder after removal by the subcarrier removal part, for transmission channel estimates $H(f)$ $(1 \leq f \leq N''_{OS} \times (N_{FFT}/1))$ outputted from the second FFT part.

In the transmission channel estimation part, the subcarrier interpolation part uses N (where N is an integer of 2 or more) subcarriers to interpolate the respective subcarriers based on a (N−1)th order function.

In the processing size of the second FFT part in the transmission channel estimation part, which is $N''_{OS} \times N'_{FFT}$ $(N'_{FFT} = N_{FFT}/1)$, l=m×n, and the processing size $N''_{OS} \times N'_{FFT}$ can be made identical to the processing size $N'_{OS} \times N_{FFT}$ of the first FFT part.

The equalizing method of the present invention is an equalizing method involving receiving a digitally modulated single-carrier signal and performing equalization using frequency domain signal processing, wherein a received signal sampled using a predetermined number of over-samples is filtered by conversion to an over-sample number small enough to avoid foldover noise generation in the frequency domain, and, on the other hand, the received signal is converted to an over-sample number large enough to obtain sufficient timing resolution, path timing detection is carried out using this timing resolution, transmission channel responses corresponding to the path timings are converted to the frequency domain, transmission channel estimates corresponding to the subcarriers of the received signal in the frequency domain are calculated, and the weights of the equalizing filter used for the filtering are calculated from the channel estimates.

In the equalizer of the present invention, the processing size of the FFT parts can be suppressed and superior equalization characteristics can be implemented by using different over-sample numbers for every process in the filtering part and channel estimation part of a frequency equalizer performing equalization based on frequency domain signal processing.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

Figure 1:
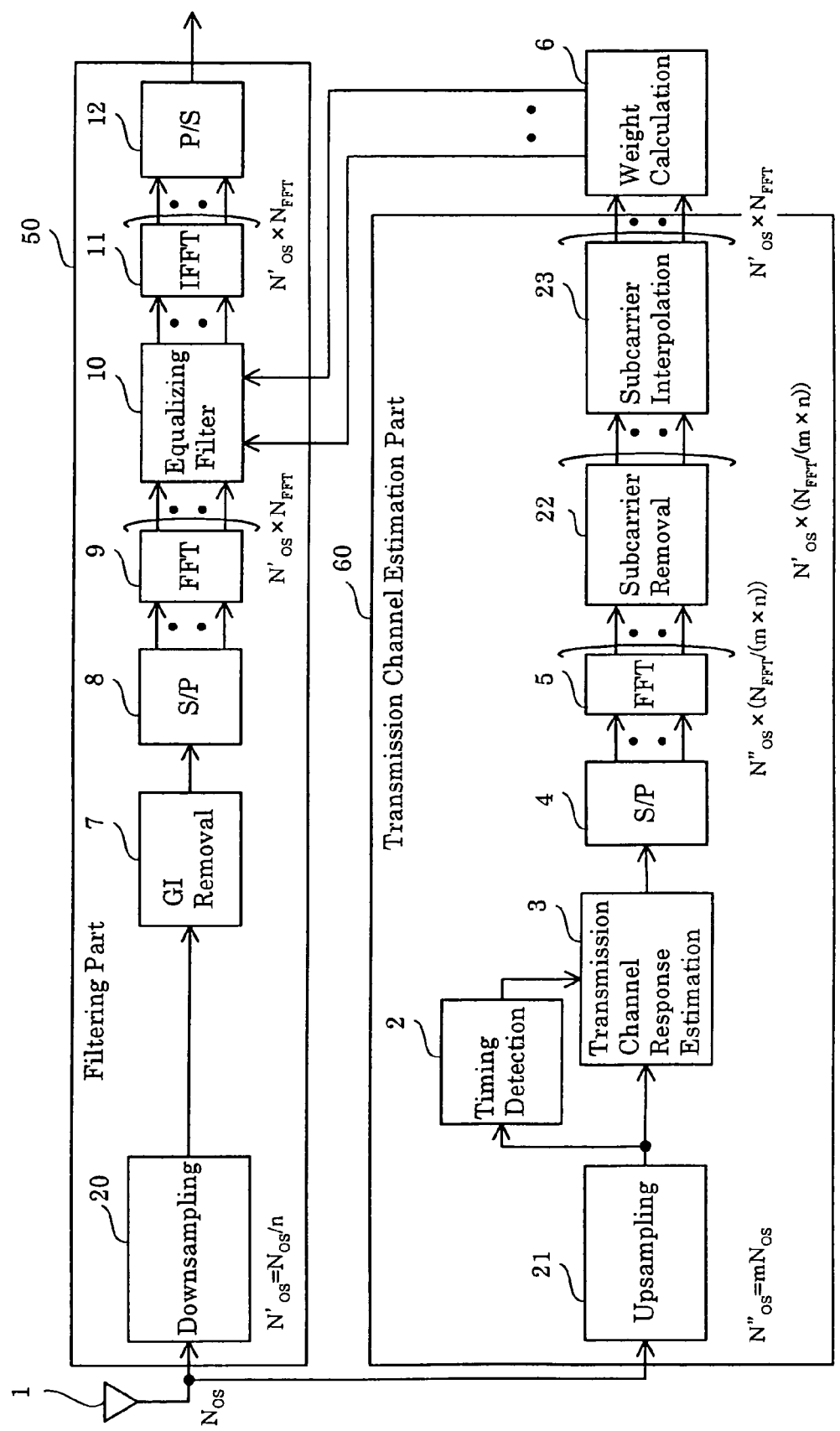
FIG. 1 is a schematic block diagram illustrating an equalizer used in a first embodiment of the present invention.
Figure 8:
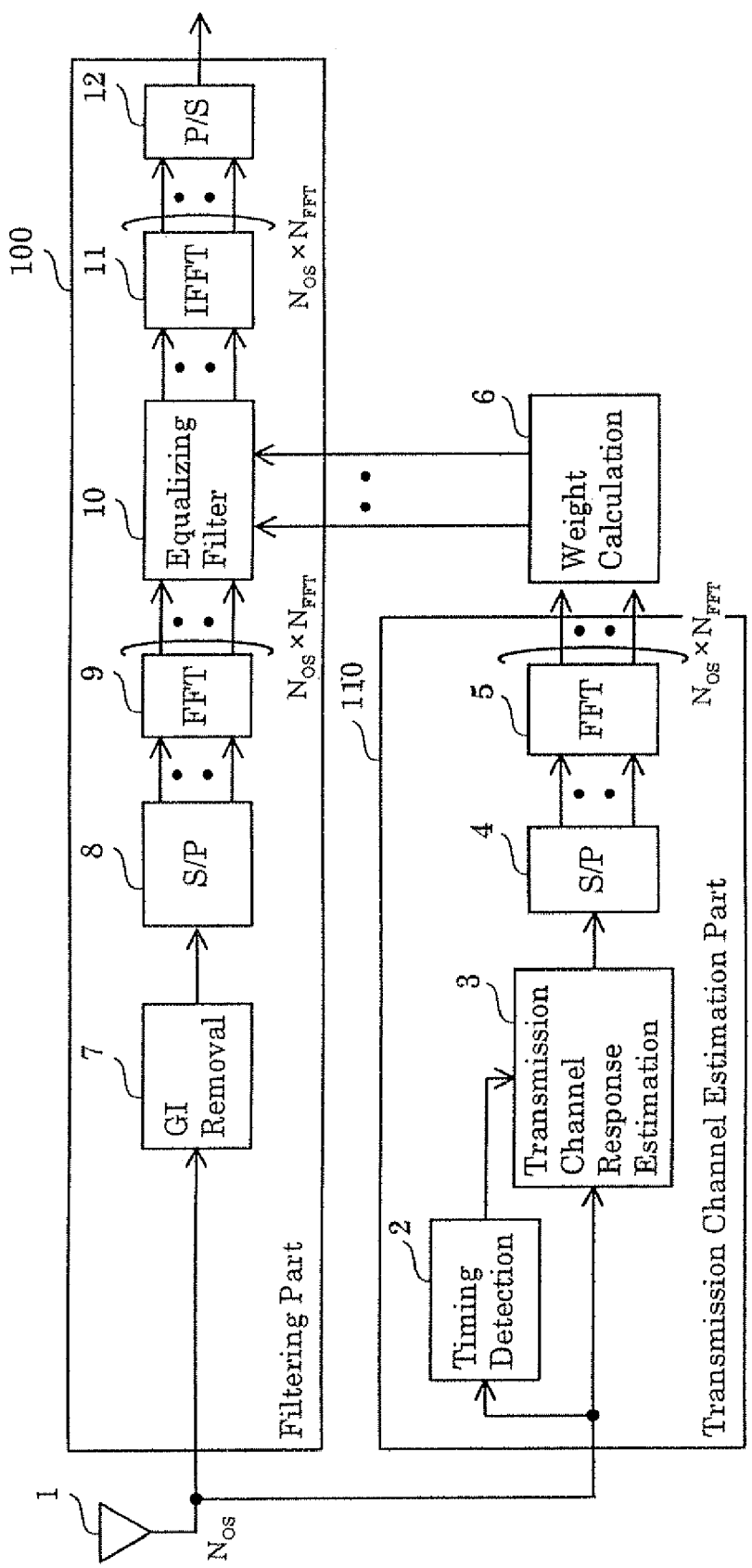
FIG. 8 is a schematic block diagram illustrating a conventional equalizer.

A first embodiment of the present invention will be now explained in detail by referring to drawings. FIG. 1 is a schematic block diagram illustrating an equalizer used in a first embodiment of the present invention, with parts identical to those shown in FIG. 8 assigned the same keys. As shown in FIG. 1, this equalizer comprises receiving antenna 1, filtering part 50, weight calculation part 6, and transmission channel estimation part 60. Receiving antenna 1 receives a digitally modulated single-carrier signal. Filtering part 50 performs filtering by converting a received signal sampled using a predetermined number of over-samples to an over-sample number small enough to avoid frequency-domain foldover noise generation. Transmission channel estimation part 60 performs path timing detection at sufficient timing resolution by converting the received signal sampled using a predetermined number of over-samples to an over-sample number large enough to obtain sufficient timing resolution, converts transmission channel responses for each path timing to the frequency domain, and calculates transmission channel estimates corresponding to the subcarriers of the received signal in the frequency domain. The frequency-domain channel estimates outputted from transmission channel estimation part 60 are inputted to weight calculation part 6, which calculates the weights of the equalizing filter used in filtering part 50. The equalizer of the present invention is characterized by the fact that each process in filtering part 50 and transmission channel estimation part 60 is carried out using a different over-sample number.

The filtering part 50 comprises downsampling part 20, GI removal part 7, S/P converter 8, FFT part 9, equalizing filter 10, IFFT part 11, and P/S converter 12. Downsampling part 20 downsamples a received signal sampled using an over-sample number of $N_{OS}$ to an over-sample number of $N'_{OS}$ ($N'_{OS} = N_{OS}/n$, where n is 1 or greater and is an integer equal to a power of 2). A received signal with an over-sample number of $N'_{OS}$ downsampled by downsampling part 20 is inputted to GI removal part 7, which removes the portion corresponding to the GI from the received signal. S/P converter 8 performs S/P conversion of the received signal, from which the GI has been removed by GI removal part 7. The received signal converted by S/P converter 8 is inputted to FFT part 9, which converts it to the frequency domain using FFT of $N'_{OS} \times N_{FFT}$ points ($N_{FFT}$: FFT block length of FFT part 9). Because the FFT block length $N_{FFT}$ of FFT part 9 is determined such that generation of influence from multipath interference exceeding the GI and in cases where the GI is not added is prevented, the processing size of FFT part 9 can be reduced by reducing the number of over-samples $N'_{OS}$. The number of over-samples $N'_{OS}$ can be reduced to an extent sufficient to avoid foldover noise generation in received signals in the frequency domain. The weights calculated by weight calculation part 6 and the received signal converted to the frequency domain by FFT part 9 are inputted to equalizing filter 10, which performs filtering (equalization) of the received signal in the frequency domain. The equalized frequency-domain signal outputted by equalizing filter 10 is inputted to IPPT part 11, which converts it to the time domain using IFFT of $N'_{OS} \times N_{FFT}$ points. P/S converter 12 performs P/S conversion of the signal converted to the time domain and outputs a demodulated signal.

The transmission channel estimation part 60 comprises upsampling part 21, timing detection part 2, transmission channel response estimation part 3, S/P converter 4, FFT part 5, subcarrier removal part 22, and subcarrier interpolation part 23. Upsampling part 21 upsamples a received signal with an over-sample number of $N_{OS}$ received by receiving antenna 1 to an over-sample number of $N''_{OS}$ ($N''_{OS}=mN_{OS}$, where m is 1 or greater and is an integer equal to a power of 2). The received signal with an over-sample number of $N''_{OS}$ is inputted to timing detection part 2, which uses the pilot signal contained in the received signal to detect the timing of a plurality of paths. As far as the transmission channel estimation accuracy in the frequency domain is concerned, the transmission channel estimation accuracy in the frequency domain strongly depends on the timing resolution of the paths detected by timing detection part 2, in other words, on the number of over-samples $N''_{OS}$, and can be improved in proportion to the magnitude of $N''_{OS}$.

Figure 2:
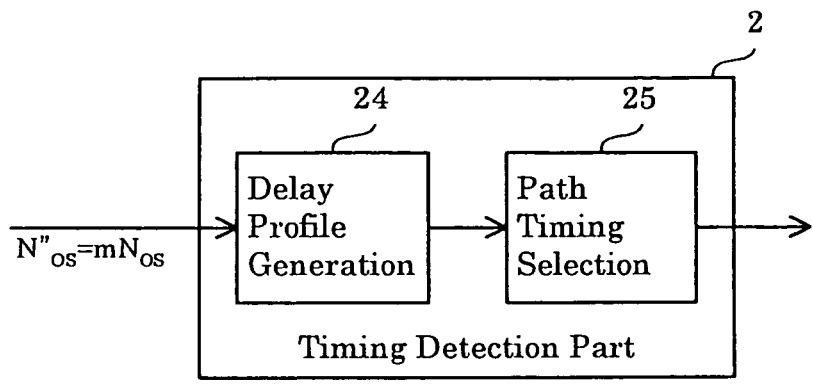
FIG. 2 is a block diagram illustrating an exemplary configuration of a timing detection part.

FIG. 2 is a block diagram illustrating the configuration of timing detection part 2. Timing detection part 2 comprises delay profile generation part 24 and path timing selection part 25. The received signal with an over-sample number of $N''_{OS}$ is inputted to delay profile generation part 24, which generates a delay profile based on the results of detection of sliding correlation between the pilot signal contained in the received signal and a known pilot signal sequence. The delay profile generated by delay profile generation part 24 is inputted to path timing selection part 25, which selects the timings of a plurality of high-level paths.

The received signal with an over-sample number of $N''_{OS}$ and the timings detected by timing detection part 2 are inputted to transmission channel response estimation part 3, which uses the pilot signal contained in the received signal to calculate transmission channel estimates at the timing points and to obtain impulse responses. S/P converter 4 performs S/P conversion of the impulse responses of the transmission channels estimated by transmission channel response estimation part 3. The impulse responses of the transmission channel converted by S/P converter 4 are inputted to FFT part 5, which outputs transmission channel estimates converted to the frequency domain using FFT of $N''_{OS} \times N'_{FFT}$ points ($N'_{FFT}=N_{FFT}/l$, where l is 1 or greater and is an integer equal to a power of 2 and $N'_{FFT}$ is the FFT block length of FFT part 5). At such time, the FFT block length $N'_{FFT}$ has to be reduced to $N_{FFT}/l$ in order to avoid increasing the processing size of FFT part 5. In general, the FFT block length of impulse responses can be reduced to a level that is approximately several times larger than the maximum path delay of the transmission channel. Here, when l=m×n, the processing size of FFT part 5, i.e. $N''_{OS} \times N'_{FFT}$, is identical to the processing size of FFT part 9 used for the received signal, i.e. $N'_{OS} \times N_{FFT}$, which permits a reduction in the maximum processing size of FFT parts 5, 9. Below, explanations are provided based on the assumption that l=m×n.

Figure 3:
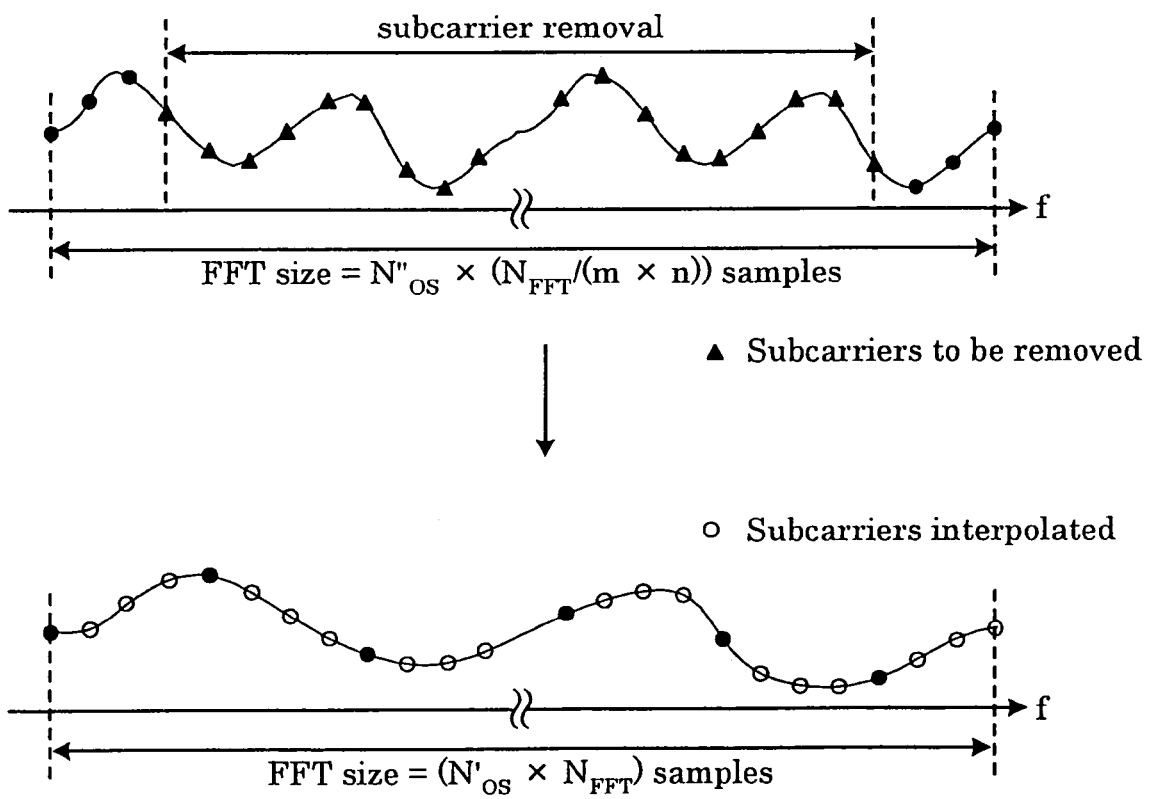
FIG. 3 is a diagram explaining subcarrier removal and subcarrier interpolation.

To calculate transmission channel estimates corresponding to the subcarriers of the received signal in the frequency domain, the transmission channel estimates converted to the frequency domain by FFT part 5 are inputted to subcarrier removal part 22, which removes high frequency component subcarriers from these subcarriers. The subcarriers remaining after removal by subcarrier removal part 22 are inputted to subcarrier interpolation part 23, which performs subcarrier interpolation between these subcarriers. FIG. 3 is a diagram explaining the way subcarrier removal and subcarrier interpolation are performed. The transmission channel estimates H(f) ($1 \leq f \leq N''_{OS} \times (N_{FFT}/(m \times n))$) with an over-sample number of $N''_{OS}$ outputted from FFT part 5 are inputted to subcarrier removal part 22, which removes the high-frequency components of H(f), i.e. subcarriers in the range of $(N'_{OS}/2) \times (N_{FFT}/(m \times n)) < f \leq (N''_{OS} - N'_{OS}/2) \times (N_{FFT}/(m \times n))$. Next, because the subcarrier resolution is set to 1/(m×n) by setting the FFT block length of FFT part 5 to $N_{FFT}/(m \times n)$, subcarrier interpolation part 23 performs subcarrier interpolation with (m×n)−1 subcarriers each between the subcarriers, using the subcarriers in the range of $1 \leq f \leq (N'_{OS}/2) \times (N_{FFT}/(m \times n))$, and $(N''_{OS}-N'_{OS}/2) \times (N_{FFT}/(m \times n)) < f \leq N''_{OS} \times (N_{FFT}/(m \times n))$, i.e. the remainder after removal by subcarrier removal part 22, and generates transmission channel estimates H(f) ($1 \leq f \leq N'_{OS} \times N_{FFT}$) corresponding to the received signal in the frequency domain. FIG. 3 illustrates an example, in which m=2 and n=2, the removed subcarriers are represented by the triangles, and the interpolated subcarriers by white circles. The central portion corresponding to ¾ of all the subcarriers of the transmission channel estimates H(f) is removed, and H(f) are obtained by interpolating three subcarriers at a time between remaining subcarriers. Methods of subcarrier interpolation include, inter alia, a method, in which N (where N is an integer of 2 or more) subcarriers are used to interpolate subcarriers each between the subcarriers based on a function of (N−1)th order (Lagrange interpolation). If the FFT block length $N_{FFT}/(m \times n)$ of FFT part 5 is sufficiently large in comparison with the maximum path delay of the transmission channel, subcarrier interpolation can be carried out using simple linear interpolation (first-order Lagrange interpolation).

The frequency-domain transmission channel estimates outputted from subcarrier interpolation part 23 are inputted to weight calculation part 6, which calculates the weights of equalizing filter 10. Weight calculation part 6 uses MMSE, zero-forcing, etc.

As explained above, in comparison with the conventional equalizer using an over-sample number of $N''_{OS}$, the present embodiment permits a reduction in the processing sizes of FFT parts 5, 9 and IFFT part 11 to 1/(m×n), which makes it possible to achieve the same characteristics while significantly reducing the magnitude of the computational burden of weight calculation part 6 and equalizing filter 10.

Figure 4:
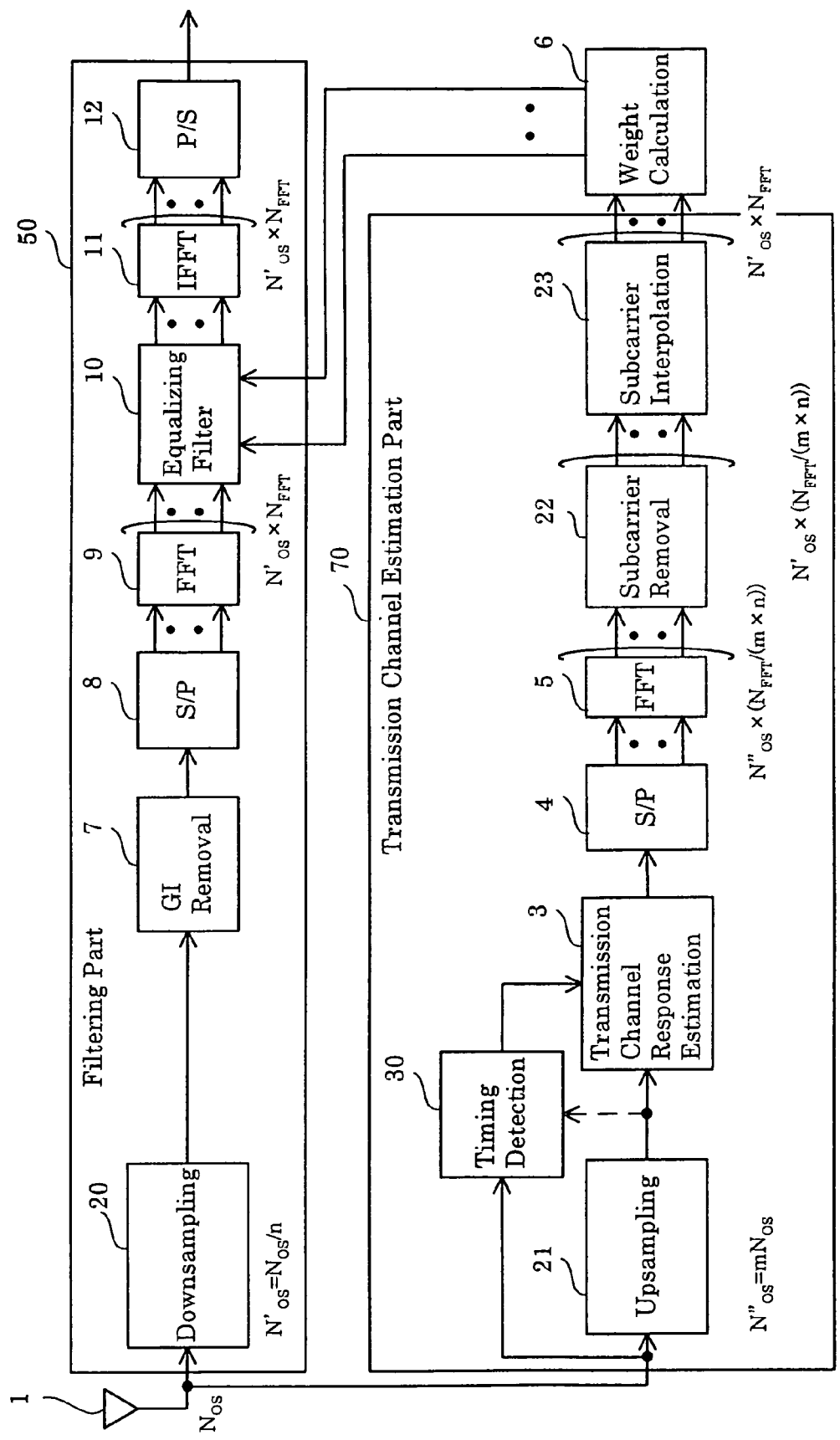
FIG. 4 is a schematic block diagram illustrating an equalizer used in a second embodiment of the present invention.

Next, a second embodiment of the present invention will be explained in detail by referring to drawings. FIG. 4 is a schematic block diagram illustrating an equalizer used in a second embodiment of the present-invention, with parts identical to those shown in FIG. 1 assigned the same keys. This conventional equalizer comprises receiving antenna 1, filtering part 50, weight calculation part 6, and transmission channel estimation part 70. While the operation of receiving antenna 1, filtering part 50, and weight calculation part 6 in the present embodiment is the same as in the first embodiment, the operation of transmission channel estimation part 70 is different from the operation of transmission channel estimation part 60 in the first embodiment. In the first embodiment, path timing detection was carried out using an upsampled received signal, and the processing of the timing detection part became more complicated with the increase in the number of over-samples $N''_{OS}$. Thus, in this embodiment, the increase in the computational burden of the timing detection part is suppressed by improving the timing resolution during path timing detection using a pre-upsampling received signal with an over-sample number of $N_{OS}$.

The transmission channel estimation part 70 comprises upsampling part 21, timing detection part 30, transmission channel response estimation part 3, S/P converter 4, FFT part 5, subcarrier removal part 22, and subcarrier interpolation part 23. Upsampling part 21 upsamples a received signal with an over-sample number of $N_{OS}$ received by receiving antenna 1 to an over-sample number of $N''_{OS}$. The received signal with an over-sample number of $N_{OS}$ is inputted to timing detection part 30, which uses the pilot signal contained in the received signal to detect the timing of a plurality of paths.

Figure 5:
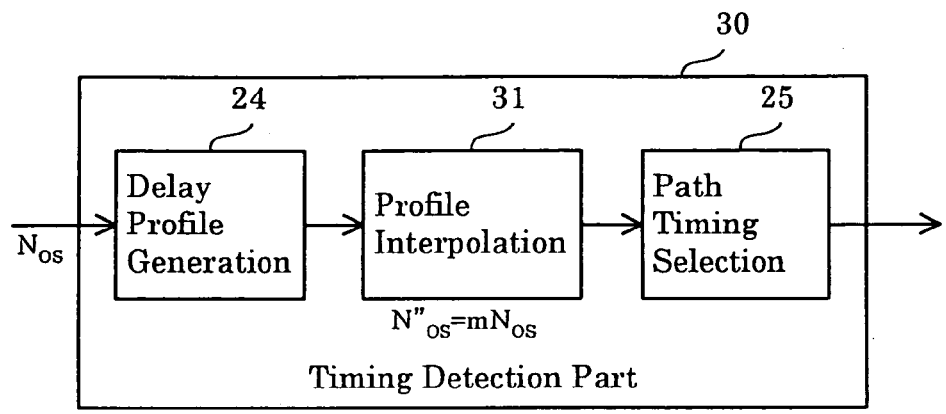
FIG. 5 is a block diagram illustrating an exemplary configuration of a timing detection part.

FIG. 5 is a block diagram illustrating the configuration of timing detection part 30. Timing detection part 30 comprises delay profile generation part 24, profile interpolation part 31, and path timing selection part 25. In timing detection part 30, due to the large computational burden involved in the detection of sliding correlation in delay profile generation part 24, generating a delay profile with an over-sample number of $N''_{OS}$ by interpolating a delay profile with an over-sample number of $N_{OS}$ permits a greater reduction in the computational burden than generating a delay profile with an over-sample number of $N''_{OS}$ using a received signal with an over-sample number of $N''_{OS}$. The received signal with an over-sample number of $N_{OS}$ is inputted to delay profile generation part 24, which generates a delay profile based on the results of detection of sliding correlation between the pilot signal contained in the received signal and a known pilot signal sequence. The delay profile with an over-sample number of $N_{OS}$ generated by delay profile generation part 24 is inputted to profile interpolation part 31, which interpolates it to an over-sample number of $N''_{OS}$. The delay profile with an over-sample number of $N''_{OS}$ produced by interpolation in profile interpolation part 31 is inputted to path timing selection part 25, which selects the timings of a plurality of high-level paths.

Figure 6:
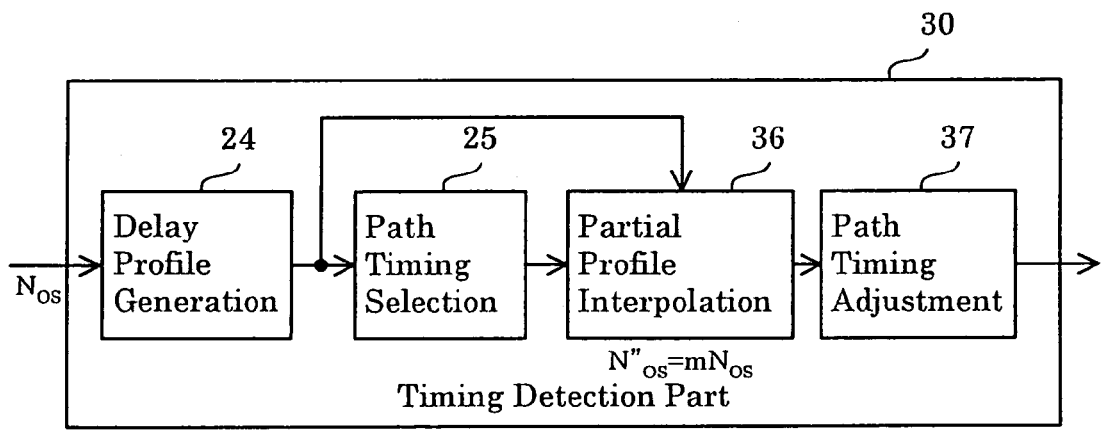
FIG. 6 is a block diagram illustrating another exemplary configuration of a timing detection part.

FIG. 6 is a block diagram illustrating another configuration of timing detection part 30. Timing detection part 30 comprises delay profile generation part 24, path timing selection part 25, partial profile interpolation part 36, and path timing adjustment part 37. In the configuration of FIG. 6, the computational burden can be reduced even more in comparison with the configuration of FIG. 5 based on limiting the regions of delay profile interpolation to the peripheral portions of path timings. The received signal with an over-sample number of $N_{OS}$ is inputted to delay profile generation part 24, which generates a delay profile based on the results of detection of sliding correlation between the pilot signal contained in the received signal and a known pilot signal sequence. The delay profile with an over-sample number of $N_{OS}$ generated by delay profile generation part 24 is inputted to path timing selection part 25, which selects the timings of a plurality of high-level paths. The delay profile with an over-sample number of $N_{OS}$ generated by delay profile generation part 24 and a plurality of path timings selected by path timing selection part 25 are inputted to partial profile interpolation part 36, which interpolates the delay profile in the peripheral portions of the path timings to an over-sample number of $N''_{OS}$. The partial delay profile generated by partial profile interpolation part 36 is inputted to path timing adjustment part 37, which designates the highest-level points in each path as the path timings.

Figure 7:
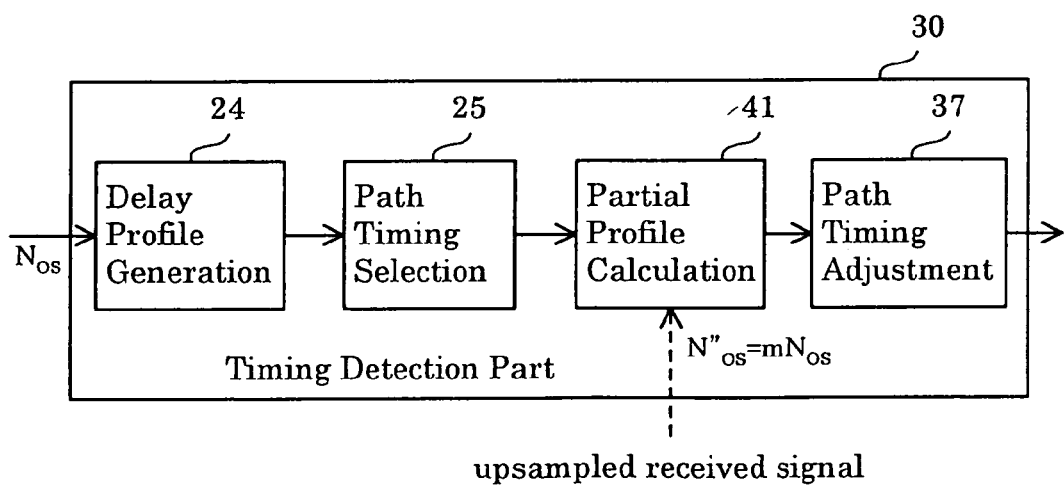
FIG. 7 is a block diagram illustrating yet another exemplary configuration of a timing detection part.

FIG. 7 is a block diagram illustrating yet another configuration of timing detection part 30. Timing detection part 30 comprises delay profile generation part 24, path timing selection part 25, partial profile calculation part 41, and path timing adjustment part 37. Although the configuration of FIG. 7 is analogous to the configuration of FIG. 6, it is different in that calculations are performed using a received signal with an over-sample number of $N''_{OS}$ instead of interpolating a partial delay profile. While the computational burden is slightly larger than in the configuration of FIG. 6, a partial delay profile can be calculated precisely. The received signal with an over-sample number of $N_{OS}$ is inputted to delay profile generation part 24, which generates a delay profile based on the results of detection of sliding correlation between the pilot signal contained in the received signal and a known pilot signal sequence. The delay profile with an over-sample number of $N_{OS}$ generated by delay profile generation part 24 is inputted to path timing selection part 25, which selects the timings of a plurality of high-level paths. The upsampled received signal with an over-sample number of $N''_{OS}$ and a plurality of path timings selected by path timing selection part 25 are inputted to partial profile calculation part 41, which calculates the delay profile in the peripheral portions of the path timings. The partial delay profile generated by partial profile calculation part 41 is inputted to path timing adjustment part 37, which designates the highest-level points in each path as the path timings.

The received signal with an over-sample number of $N''_{OS}$ and the timings detected by timing detection part 2 are inputted to transmission channel response estimation part 3, which uses the pilot signal contained in the received signal to calculate transmission channel estimates at the timing points and to obtain impulse responses. S/P converter 4 performs S/P conversion of the impulse responses of the transmission channels estimated by transmission channel response estimation part 3. The impulse responses of the transmission channel converted by S/P converter 4 are inputted to FFT part 5, which outputs transmission channel estimates converted to the frequency domain using FFT of $N''_{OS} \times N'_{FFT}$ points. To calculate transmission channel estimates corresponding to the subcarriers of the received signal in the frequency domain, the transmission channel estimates converted to the frequency domain by FFT part 5 are inputted to subcarrier removal part 22, which removes high frequency component subcarriers from these subcarriers. The subcarriers remaining after removal by subcarrier removal part 22 are inputted to subcarrier interpolation part 23, which performs subcarrier interpolation between these subcarriers.

As explained above, in comparison with the conventional equalizer using an over-sample number of $N''_{OS}$, the present embodiment permits a reduction in the processing sizes of FFT parts 5, 9 and IFFT part 11 to 1/(m×n), which makes it possible to achieve the same characteristics while significantly reducing the magnitude of the computational burden of weight calculation part 6 and equalizing filter 10. In addition, the increase in the computational burden of timing detection part 30 can be suppressed by improving the timing resolution during path timing detection using a pre-upsampling received signal with an over-sample number of $N_{OS}$.

Although the present invention has been illustrated using an equalizer intended to be used with one receiver/transmitter antenna, the present invention can also be applied to MIMO (Multiple Input Multiple Output) systems with a plurality of receiver/transmitter antennas.

Moreover, the present invention is applicable to both base station radio equipment and mobile station radio equipment used in mobile communications systems.

What is claimed is:

1. An equalizer receiving a digitally modulated single-carrier signal and performing equalization using frequency domain signal processing, wherein the equalizer comprises:
   a filtering part accepting a received signal sampled using a predetermined number of over-samples as input and performing filtering by converting the received signal to an over-sample number small enough to avoid foldover noise generation in the frequency domain;
   a transmission channel estimation part converting the received signal to an over-sample number large enough to obtain sufficient timing resolution, performing path timing detection using the timing resolution, converting the transmission channel responses corresponding to path timings to the frequency domain, and calculating transmission channel estimates corresponding to subcarriers of the received signal in the frequency domain; and
   a weight calculation part, which calculates weights of an equalizing filter used in the filtering part based on an output of the transmission channel estimation part.

2. The equalizer according to claim 1, wherein the filtering part has:
   a downsampling part that downsamples the received signal sampled using an over-sample number of $N_{OS}$ to an over-sample number of $N'_{OS}$ ($N'_{OS}=N_{OS}/n$, where n is 1 or greater and an integer equal to a power of 2),
   a first FFT part that performs a fast Fourier transform (FFT: Fast Fourier Transform) on an output of the downsampling part using $N'_{OS}*N_{FFT}$ points ($N_{FFT}$: fast Fourier transform block length),
   an equalizing filter that filters an output of the first FFT part using the weights, and
   an IFFT part that performs an inverse fast Fourier transform (IFFT: Inverse Fast Fourier Transform) on an output of the equalizing filter using $N'_{OS}*N_{FFT}$ points.

3. The equalizer according to claim 1, wherein the transmission channel estimation part has:
   an upsampling part that upsamples the received signal sampled using an over-sample number of $N_{OS}$ to an over-sample number of $N''_{OS}$ ($N''_{OS}=mN_{OS}$, where m is 1 or greater and an integer equal to a power of 2),
   a timing detection part that detects timings of a plurality of paths using an output of the upsampling part,
   a transmission channel response estimation part that estimates the transmission channels at a plurality of detected path timings,
   a second FFT part that performs FFT on an impulse responses obtained as output from the transmission channel response estimation part using $N''_{OS}*N'_{FFT}$ points ($N'_{FFT}=N_{FFT}/l$, where l is 1 or greater and an integer equal to a power of 2 and $N'_{FFT}$ is an FFT block length),
   a subcarrier removal part that removes high frequency component subcarriers from the subcarriers outputted from the second FFT part, and
   a subcarrier interpolation part that performs subcarrier interpolation between subcarriers remaining after removal by the subcarrier removal part.

4. The equalizer according to claim 1, wherein the transmission channel estimation part has:
   an upsampling part that upsamples the received signal sampled using an over-sample number of $N_{OS}$ to an over-sample number of $N''_{OS}$,
   a timing detection part that detects timings of a plurality of paths using the received signal,
   a transmission channel response estimation part that estimates the transmission channels at a plurality of detected path timings,
   a second FFT part that performs FFT on an impulse responses obtained as output from the transmission channel response estimation part using $N''_{OS}*N_{FFT}$ points,
   a subcarrier removal part that removes high frequency component subcarriers from the subcarriers outputted from the second FFT part, and
   a subcarrier interpolation part that performs subcarrier interpolation between the subcarriers remaining after removal by the subcarrier removal part.

5. The equalizer according to claim 1, wherein the weight calculation part calculates the weights of the equalizing filter based on a minimum mean square error method (MMSE: Minimum Mean Square Error) or a zero forcing method.

6. The equalizer according to claim 3, wherein the timing detection part has:
   a delay profile generation part that generates a delay profile based on results of detection of sliding correlation between a known pilot signal sequence and a pilot signal contained in an upsampled received signal with an over-sample number of $N''_{OS}$, and
   a path timing selection part that selects the timings of a plurality of high-level paths based on the delay profile.

7. The equalizer according to claim 4, wherein the timing detection part has:
   a delay profile generation part that generates a delay profile based on results of detection of sliding correlation between a known pilot signal sequence and a pilot signal contained in a received signal with an over-sample number of $N_{OS}$,
   a profile interpolation part that interpolates the delay profile to an over-sample number of $N''_{OS}$, and
   a path timing selection part that selects the timings of a plurality of high-level paths using the output of the profile interpolation part.

8. The equalizer according to claim 4, wherein the timing detection part has:
   a delay profile generation part that generates a delay profile based on results of detection of sliding correlation between a known pilot signal sequence and a pilot signal contained in a received signal with an over-sample number of $N_{OS}$,
   a path timing selection part that selects the timings of a plurality of high-level paths based on the delay profile,
   a partial profile interpolation part that interpolates the delay profile in peripheral portions of the path timings to an over-sample number of $N''_{OS}$ based on the delay profile and the timings of the plurality of paths, and
   a path timing adjustment part that designates the highest-level points in each path as the path timings using an output of the partial profile interpolation part.

9. The equalizer according to claim 4, wherein the timing detection part has:
   a delay profile generation part that generates a delay profile based on results of detection of sliding correlation between a known pilot signal sequence and a pilot signal contained in a received signal with an over-sample number of $N_{OS}$,
   a path timing selection part that selects the timings of a plurality of high-level paths based on the delay profile,
   a partial profile calculation part that calculates the delay profile in peripheral portions of the path timings using the timings of the plurality of paths and the upsampled received signal with an over-sample number of $N''_{OS}$, and a path timing adjustment part that designates the highest-level point in each path as the path timing using an output of the partial profile calculation part.

10. The equalizer according to claim 3 or 4, wherein the subcarrier removal part removes sub carriers in the range of $(N'_{OS}/2)*(N_{FFT}/1) < f \leq (N''_{OS} - N'_{OS}/2)*(N_{FFT}/1)$ for transmission channel estimates $H(f)(1 \leq f \leq N''_{OS}*(N_{FFT}/1))$ outputted from the second FFT part.

11. The equalizer according to claims 3 or 4, wherein the subcarrier interpolation part performs subcarrier interpolation with 1-1 subcarriers each between the subcarriers, using subcarriers in the range of $1 \leq f \leq (N'_{OS}/2)*(N_{FFT}/1)$, $(N''_{OS} - N'_{OS}/2)*(N_{FFT}/1) < f \leq N'_{OS}*(N_{FFT}/1)$, i.e. a remainder after removal by the subcarrier removal part, for transmission channel estimates $H(f)$ $(1 \leq f \leq N''_{OS}*(N_{FFT}/1))$ outputted from the second FFT part.

12. The equalizer according to claims 3 or 4, wherein the subcarrier interpolation part uses N (where N is an integer of 2 or more) subcarriers to interpolate the respective subcarriers based on a (N−1)th order function.

13. The equalizer according to claim 3 or 4 wherein, in a processing size of the second FFT part, i.e. $N''_{OS}*N'_{FFT}$ ($N'_{FFT}=N_{FFT}/1$), $1=m*n$, and a processing size $N''_{OS}*N'_{FFT}$ can be made identical to the processing size $N'_{OS}*N_{FFT}$ of the first FFT part.

14. An equalizing method comprising receiving a digitally modulated single-carrier signal and performing equalization using frequency domain signal processing, wherein a received signal sampled using a predetermined number of over-samples is filtered by conversion to an over-sample number small enough to avoid foldover noise generation in the frequency domain, and, on the other hand, the received signal is converted to an over-sample number large enough to obtain sufficient timing resolution, path timing detection is carried out using this timing resolution, transmission channel responses corresponding to path timings are converted to the frequency domain, transmission channel estimates corresponding to subcarriers of the received signal in the frequency domain are calculated, and weights of an equalizing filter used for the filtering are calculated from the channel estimates.

* * * * *